US012806960B2

(12) United States Patent
Kinmartin et al.

(10) Patent No.: US 12,806,960 B2
(45) Date of Patent: Nov. 24, 2026

(54) VALVE SYSTEM FOR CONTROL OF HVAC AIR FLOW IN A VEHICLE

(71) Applicant: MAHLE INTERNATIONAL GMBH, Stuttgart (DE)

(72) Inventors: Jeffrey Charles Kinmartin, East Amherst, NY (US); Phillip M. Sokolofsky, Akron, NY (US); Charles Andrew Archibald, Lockport, NY (US); Bailey Reid, Lockport, NY (US); Matthew Kiss, Williamsville, NY (US); Ryan Philipps, Kenmore, NY (US); James Salmeri, Tonawanda, NY (US); George Melero, Buffalo, NY (US)

(73) Assignee: MAHLE International GmbH, Stuttgart (DE)

( * ) Notice: Subject to any disclaimer, the term of this patent is extended or adjusted under 35 U.S.C. 154(b) by 331 days.

(21) Appl. No.: 18/669,121

(22) Filed: May 20, 2024

(65) Prior Publication Data

US 2025/0026176 A1 Jan. 23, 2025

Related U.S. Application Data

(60) Provisional application No. 63/528,325, filed on Jul. 21, 2023.

(51) Int. Cl.
*B60H 1/00* (2006.01)

(52) U.S. Cl.
CPC ..... *B60H 1/00842* (2013.01); *B60H 1/00671* (2013.01); *B60H 1/00857* (2013.01); *B60H 2001/00721* (2013.01)

(58) Field of Classification Search
CPC ............ B60H 1/00671; B60H 1/00678; B60H 1/00685; B60H 1/00842; B60H 1/00857; B60H 2001/00707; B60H 2001/00721
See application file for complete search history.

(56) References Cited

U.S. PATENT DOCUMENTS 3,916,988 A 11/1975 Matsuda
4,069,724 A 1/1978 Sobotta
5,647,399 A * 7/1997 Andersen ................ F16K 11/22 251/304

(Continued)

FOREIGN PATENT DOCUMENTS

DE 10200413686 A1 10/2005
DE 102004013686 A1 10/2005

(Continued)

*Primary Examiner* — Allen R. B. Schult
(74) *Attorney, Agent, or Firm* — Barnes & Thornburg

(57) ABSTRACT

An air mixing damper system is provided. The system includes a first rotatable door that rotates about a first shaft that extends along a first axis, and a second rotatable door that rotates about a second shaft, the second shaft disposed along a second axis, the second axis is collinear with the first axis. The first door is rotatable about the first axis and the second door is rotatable about the second axis. A first actuator operatively engaged with the first shaft. A second actuator operatively engaged with the second shaft, wherein the first and second doors are each capable of rotating independently of the other of the first and second doors. An air circulation assembly with the damper system is provided.

29 Claims, 13 Drawing Sheets

(56) References Cited

U.S. PATENT DOCUMENTS

| | | | | |
|---|---|---|---|---|
| 6,019,163 | A * | 2/2000 | Saida | B60H 1/00678 454/126 |
| 6,484,755 | B1 | 11/2002 | Schwarz | |
| 6,695,691 | B1 | 2/2004 | Le | |
| 6,789,607 | B1 | 9/2004 | Jun | |
| 7,954,540 | B2 * | 6/2011 | Hoehn | B60H 1/00678 237/12.3 A |
| 8,398,468 | B2 | 3/2013 | Kim | |
| 9,616,729 | B2 | 4/2017 | Chiba et al. | |
| 10,220,668 | B2 | 3/2019 | Mazzocco et al. | |
| 10,279,652 | B2 * | 5/2019 | Wagnitz | B60H 1/00678 |
| 10,486,492 | B2 | 11/2019 | Reichel | |
| 10,507,712 | B2 * | 12/2019 | Nolta | B60J 5/0493 |
| 10,654,338 | B2 | 5/2020 | Sokolofsky et al. | |
| 11,117,443 | B2 | 9/2021 | Rausch | |
| 2004/0069483 | A1 * | 4/2004 | Natsume | B60H 1/00064 165/96 |
| 2009/0264061 | A1 | 10/2009 | Kim | |
| 2010/0009618 | A1 | 1/2010 | Dicksander et al. | |
| 2015/0044959 | A1 | 2/2015 | Chikagawa | |
| 2017/0028812 | A1 | 2/2017 | Wiesmann | |
| 2017/0282681 | A1 | 10/2017 | Wagnitz | |
| 2018/0010678 | A1 | 1/2018 | Dubois | |
| 2018/0105011 | A1 | 4/2018 | Park et al. | |
| 2018/0345752 | A1 * | 12/2018 | Nolta | B60H 1/00678 |

FOREIGN PATENT DOCUMENTS

| | | | |
|---|---|---|---|
| EP | 3144166 | B1 | 7/2019 |
| FR | 2763286 | A1 | 11/1998 |

* cited by examiner

VALVE SYSTEM FOR CONTROL OF HVAC AIR FLOW IN A VEHICLE

CROSS-REFERENCE TO RELATED APPLICATIONS

This application claims priority from U.S. Provisional Application No. 63/528,325, filed on Jul. 21, 2023, the entirety of which is hereby fully incorporated by reference herein.

BACKGROUND OF THE INVENTION

This application relates to HVAC units that are provided in vehicles for controlling the air flow and temperature of air into various portions of a passenger compartment of a vehicle. The specification improves upon various convention HVAC assemblies for vehicles.

SUMMARY OF THE INVENTION

A first representative embodiment of the disclosure is provided. The representative embodiment is an air mixing damper system. The system includes

- a first rotatable door that rotates about a first shaft that extends along a first axis;
- a second rotatable door that rotates about a second shaft, the second shaft disposed along a second axis, the second axis is collinear with the first axis;
- the first door is rotatable about the first axis and the second door is rotatable about the second axis;
- a first actuator operatively engaged with the first shaft;
- a second actuator operatively engaged with the second shaft, wherein the first and second doors are each capable of rotating independently of the other of the first and second doors.

Further representative embodiments are provided and include the embodiments of the air mixing damper system of the Representative Paragraphs below.

Another representative embodiment of the disclosure is provided. The embodiment includes an air circulation assembly. The assembly includes, comprising the air mixing damper system of the paragraph above or of any of the Representative Paragraphs below, wherein the first and second actuators and the first and second shafts are supported by a housing, wherein the housing is configured to be connected to a source of relatively cold air and a source of relatively hot air, wherein the housing establishes a mixing space therein, and the housing is further configured to be connected to selectively and independently allow air flow from the mixing space to a plurality of air outlets within a vehicle, and further comprising a controller, wherein the controller causes operation of the first actuator to cause the first door to be positioned with respect to the source of relatively hot air to selectively allow or prevent a flow of relatively hot air from the source of relatively hot air into the mixing space, and the controller causes operation of the second actuator to cause the second door to be positioned with respect to the source of relatively cold air to selectively allow or prevent a flow of relatively cold air from the source of relatively cold air to the mixing space.

Further representative embodiments of the disclosure related to the air circulation assembly are provided and include the embodiments of the air circulation assembly described in the Representative Paragraphs below.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
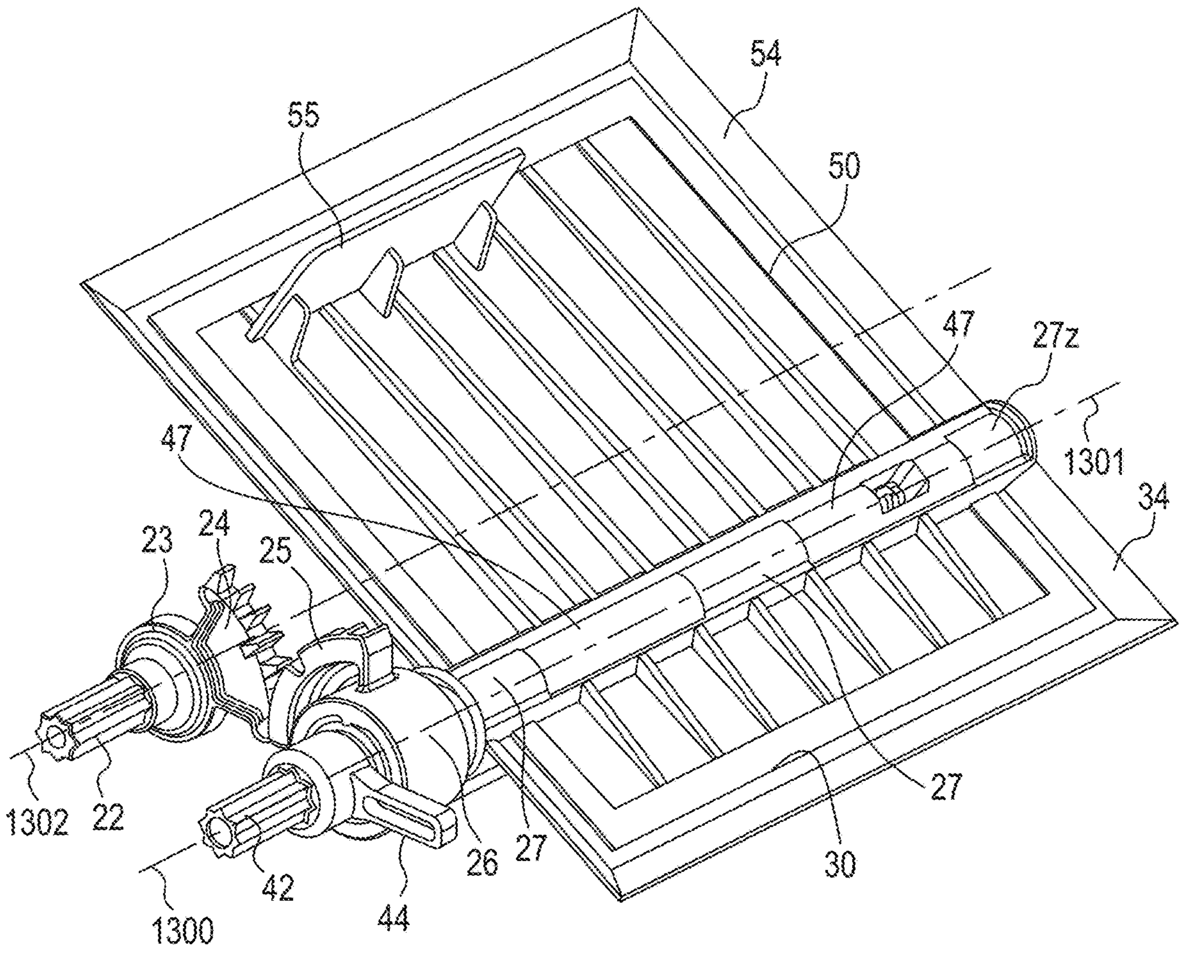
FIG. 1 is a perspective view of an air mixing damper system, with doors to isolate the hot and cold air flows aligned in a planar manner with each other, to allow hot air to pass thereby but block flow of cold air from flowing thereby.
Figure 2:
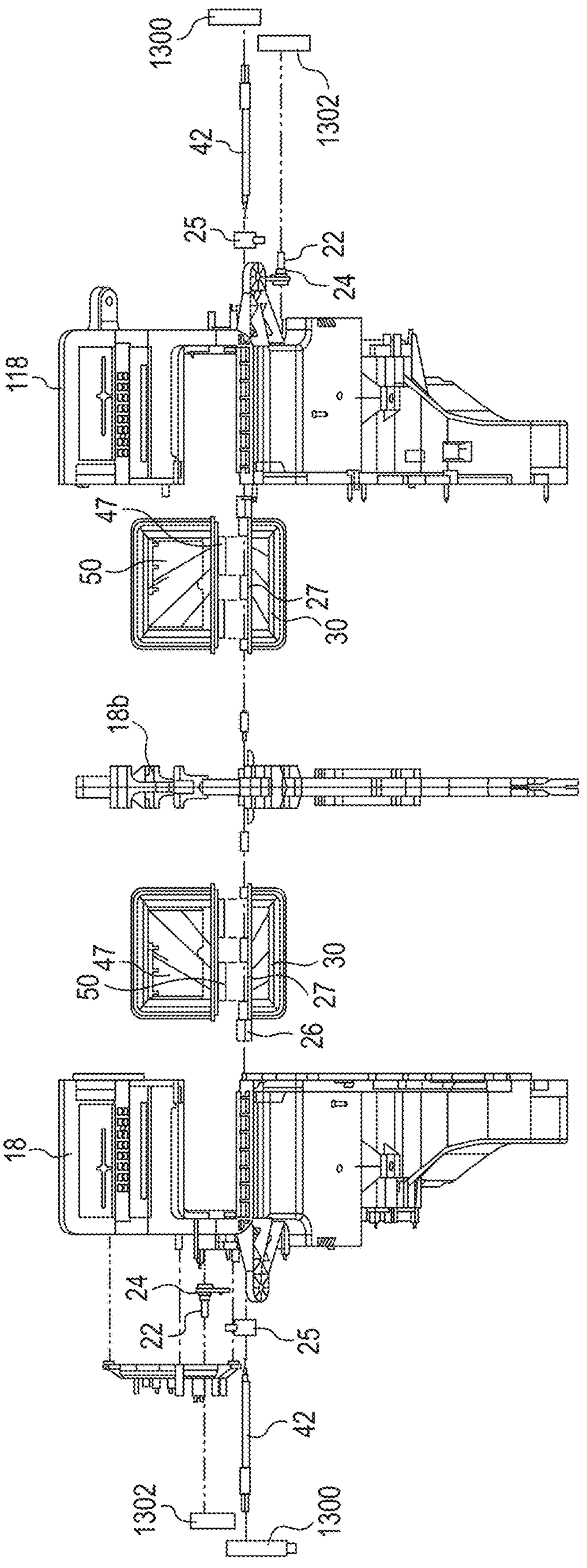
FIG. 2 is an exploded view of an air circulation assembly for a vehicle, with two air mixing damper systems, one to control air flow toward a driver's side seat area of the interior of a vehicle (left side on the figure) and a second to control air flow toward a passenger's side seat area of the interior of a vehicle (right side of the figure).
Figure 3:
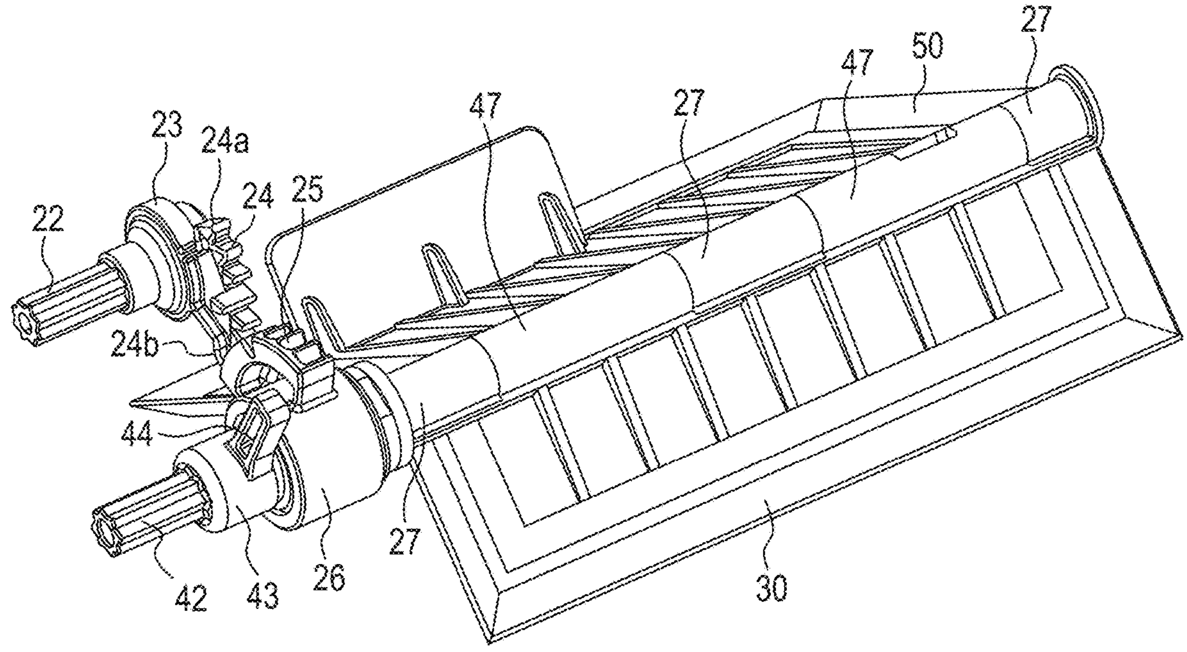
FIG. 3 is a perspective view the air mixing damper system of FIG. 1, with the doors aligned to allow both the hot and cold air flows to pass thereby.
Figure 4:
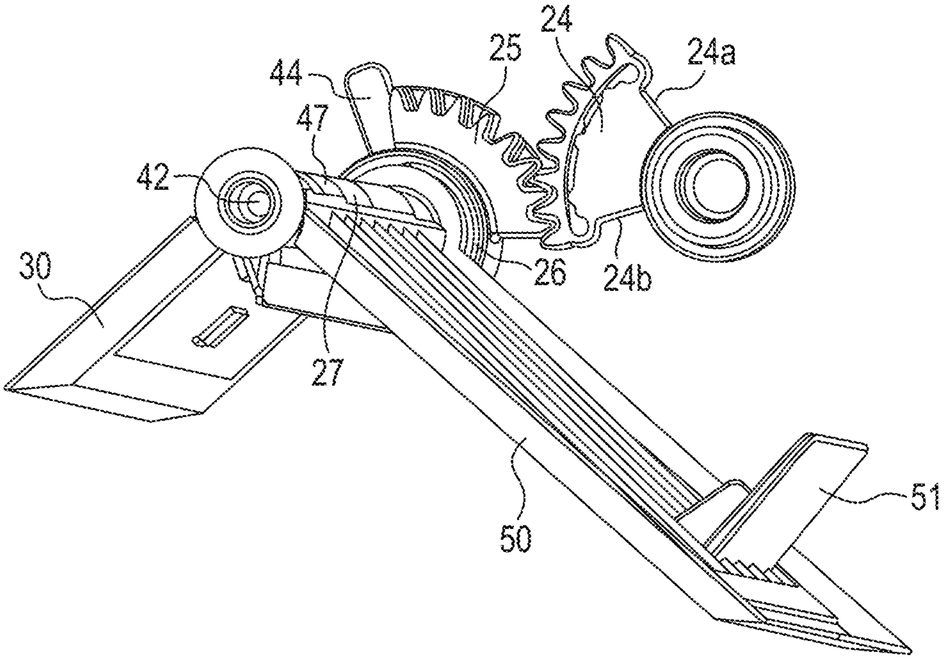
FIG. 4 is another perspective view of the air mixing damper system with the doors aligned as in FIG. 3.
Figure 5:
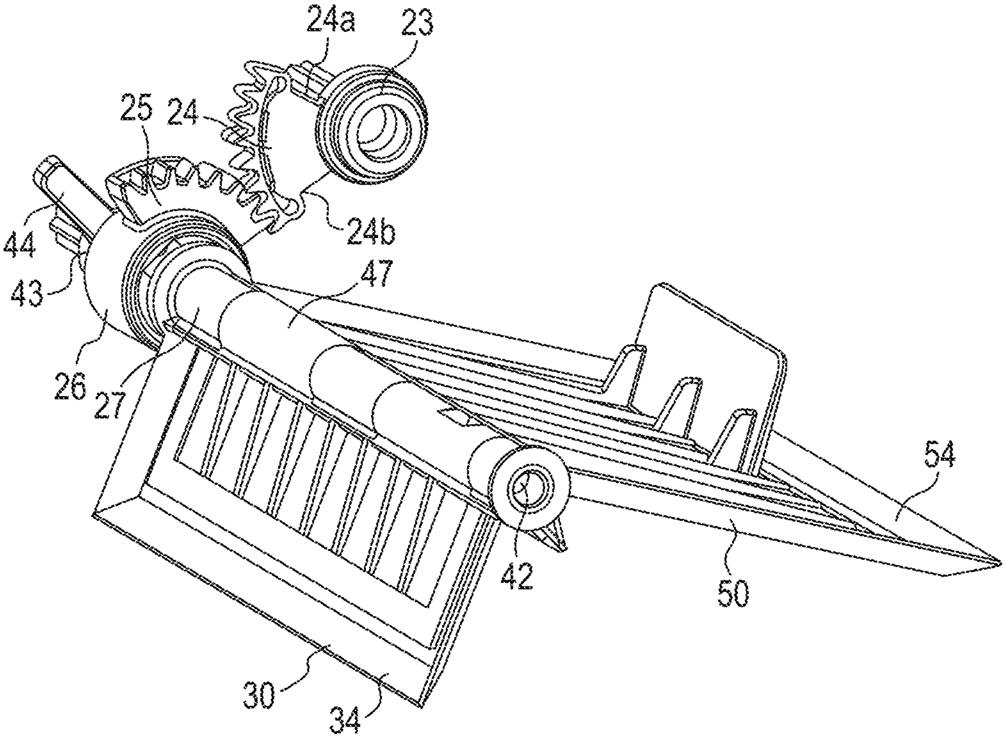
FIG. 5 is yet another perspective view of the air mixing damper system with the doors aligned as in FIG. 3.

Turning now to FIGS. 1-14*b*, an air mixing damper system 10, and an assembly 2000 that supports one or more air mixing damper systems 10 is provided. The assembly 2000 is configured to be used in a vehicle to allow for control of hot air from a hot air source (1003) and the control of cold air (1002) from a cold air source. The cold air source 1002 may be air flow from the evaporator of an air conditioning system or another cooling system that may be provided within a vehicle. The hot air source 1003 may be a heat pump heater of a heat pump system or a condenser of a refrigeration system. The hot air source may also include a heating coil, a PTC heater, or resistance electrical heaters, which may be instead of the heat pump heater or in series with the heat pump heater. In embodiments where the vehicle includes an internal combustion engine, the engine itself including all systems that generate heat within engine or are used in order to remove generated heat from the engine may be used to provide heat to the hot air source, via coolant system.

The assembly 2000, as discussed in further detail below includes a mixing chamber 16 is configured to receive air from one or both of the hot and cold air sources 1003, 1002 (via flows 1003*a*, 1002*a*) and provide a space for cold and hot air received to mix and for air to flow from the mixing chamber 16 to various systems within the vehicle, such as the defrost system (1004, control valve 1114), the de-mist system (1005, 1115 control valve), one or more air flow registers located on the dashboard of the vehicle 1006, 1116), and a floor ventilation system (1007, 1117). The assembly 2000 includes a controller 2002 (schematic, FIG. 8), that based upon the inputs provided by the vehicle occupants (i.e. desired use of air conditioning or heat in the various spaces within the vehicle, and the desired temperature within the space, and the desired air flow speed to various zones within the vehicle; the desired use of the vehicles front windshield defrost system) controls the operation of the various valves (e.g. 1114, 1115) to allow or prevent air flow to each system, and controls the operation of the cold air system and the hot air system (controls the fan speed for hot air 1003*a*, controls the fan speed for cold air 1002*a*, and controls the operation of the compressor of the heat pump system or air conditioning system) as needed to produce the desired air flows.

The air mixing damper system 10 is provided to control the flow rate as well as prevent or allow flow to the mixing chamber from both the hot air and the cold air sources. In some embodiments, the air mixing damper system 10 can be used to allow flow in a throttled manner, such that some flow of hot and/or cold air can flow into the mixing chamber 16, but some flow is prevented from flowing into the mixing chamber (schematically depicted on FIG. 13 as 1002*z*, 1003*z*. The controller 2002 can be programmed to move the first and second doors 30, 50 as appropriate to a throttled position as needed—either due to programmed door settings based upon the HVAC settings in the vehicle at the current time, or determined in real-time by the controller based upon feedback control. The disclosure herein will describe the air mixing damping system 10 specifically with respect to the open and closed positions, but one of ordinary skill in the art with a thorough review of the subject specification and figures will readily comprehend how the first and second doors 30, 50 may be positioned into intermediate throttling positions.

The assembly 2000 including the air mixing damper 10 (and in some embodiments the use of two air mixing damper systems 10 that direct air to two different mixing chambers 16, one for a zone to direct air toward the driver's seat portion of the vehicle and a separate one to direct air toward the passenger's seat portion of the vehicle) has been identified to allow for several improvements over conventional air flow control systems, such as systems where the first and second doors (e.g. a first door to allow or prevent flow of hot air—similar to flow 1003, and a second door to allow or prevent flow of cold air—similar to flow 1002) are moved together in unison and can't move with respect to each other. In these prior embodiments, the controller often needed to throttle hot or cold air flow with isolation valves that led from the mixing chamber 16 directly to the specific system (e.g. the isolation valve 1116 to the dash ventilation system, air flow 1006), and the system needed complex geometries and narrowed flow paths to ensure the proper air flow. The use of the air mixing damper system 10 has been experimentally identified to lower the overall noise in the passenger compartment from noise levels with conventional systems in an unexpected or unpredictable manner. Also, the use of the air mixing damper system 10 in some circumstances allows for less air flow (i.e. lower fan speeds) and shorter duty cycles of the air conditioning system to achieve the desired temperatures and flows to the monitored spaces, which has resulted in measured lower electrical power requirements with the use of a system with the air mixing damper system 10.

Turning now to FIGS. 1-7, the air mixing damper system 10 is provided. The system 10 is rotatably fixed within a housing 18, and the housing 18 is arranged to establish the air flow paths (e.g. cold air 1002, hot air 1003) and outlet flow paths (e.g. path to defrost 1004) with the air mixing damper system 10 positioned to control air to enter into the mixing chamber 16, as discussed herein. In situations where the first and/or second doors 30, 50 are in the closed position, the doors block the flow paths and the edges of the doors (e.g. 34, 54) contact or come into close proximity with walls or features of the housing 18 to prevent air flow. In situations where the first and/or second doors 30, 50 are in the open position, the doors are rotated away from contact or close proximity to the walls or features of the housing 18 to allow air flow. FIGS. 8-12 depict the housing 18, and specifically a portion of the housing 18 that interacts with the air flow paths to the dash vents and the floor ventilation system that of the driver's position. In embodiments, where a second air mixing damper system 10 is provided to control air flow to proximate to the passenger's seat area, the housing would interact with that air mixing damper system 10 in a similar manner.

The air mixing damper system 10 includes a first door 30, which is used to allow, prevent, or throttle air flow from the hot air system 1003 (flow 1003*a*), and a second door 50, which is used to allow, prevent, or throttle air flow from the cold air system 1002 (flow 1002*a*).

The first door 30 is fixed to a first shaft 27, such that rotation of the first shaft 27 causes rotation of the first door 30 (with respect to the housing 18). The first shaft 27 may be hollow and extends along a first axis 1300. The first door 30 is rotated by a first actuator 1104 that is fixed to the housing 18. The first actuator 1104 rotates in input 22 that extends along an axis 1302 that is spaced from but parallel to the first axis 1300. The input 22 may be a shaft that has one or more non-circular features to allow the first actuator 1104 to transfer torque to the input 22. In the embodiment depicted, the input 22 has a plurality of radial outward features that interact with corresponding features in the actuator 1104 (not shown), but in other embodiments the input may have a D shaped shaft or non-circular engagement features that interact along the axis 1302.

The input 22 fixedly supports a first hub 23 that includes a radially extending gear profile 24. The gear profile 24 is meshed with a corresponding gear profile 25 of a second hub 26, such that rotation of the input causes rotation of the first hub 23 and first gear profile 24, which causes meshed corresponding rotation of the second gear profile 25 and rotation of the second hub 26. The first shaft 27 is fixed to the second hub 26 such that the first shaft 27 rotates when the second hub 26 rotates.

Figure 6:
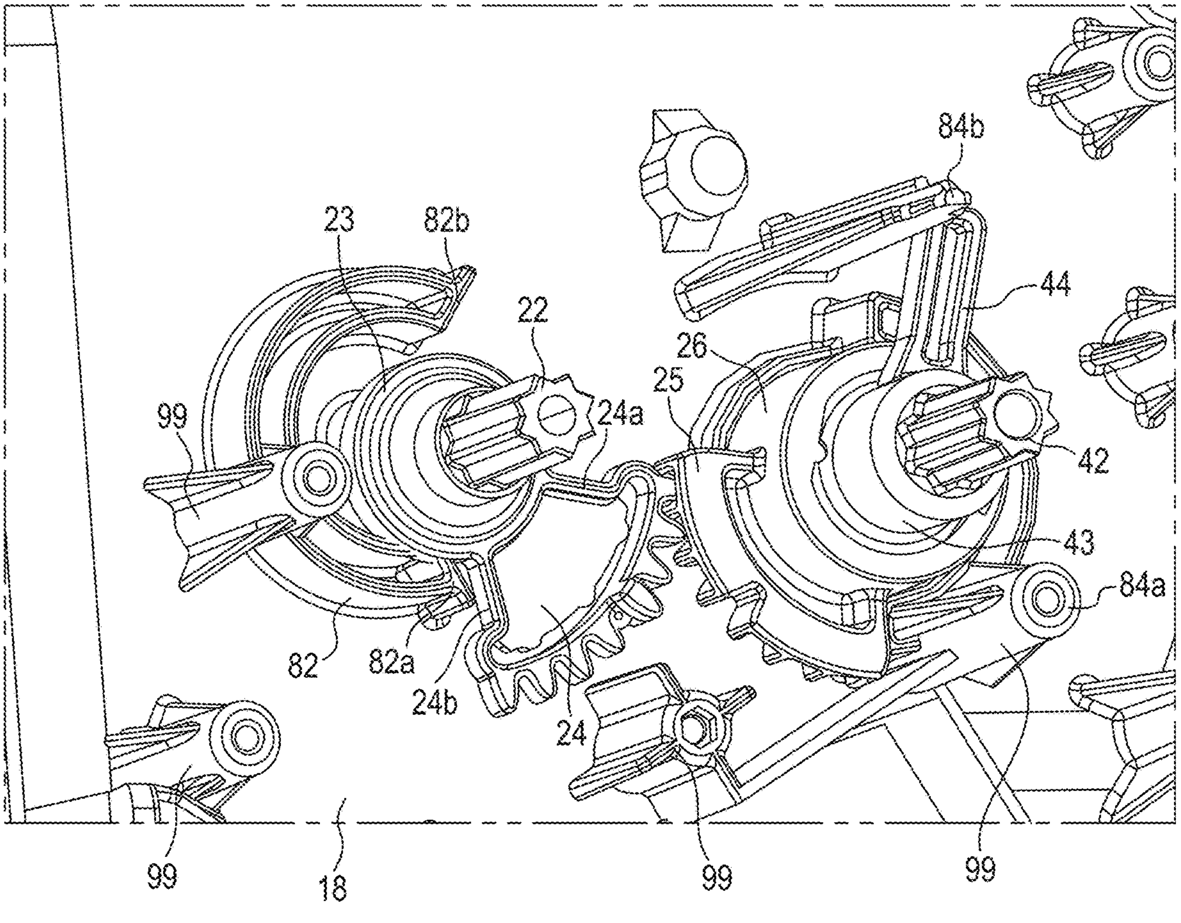
FIG. 6 is a detail view of the outside of the housing of an air circulation assembly that includes the air mixing damper system of FIG. 1 with the actuators removed.
Figure 8:
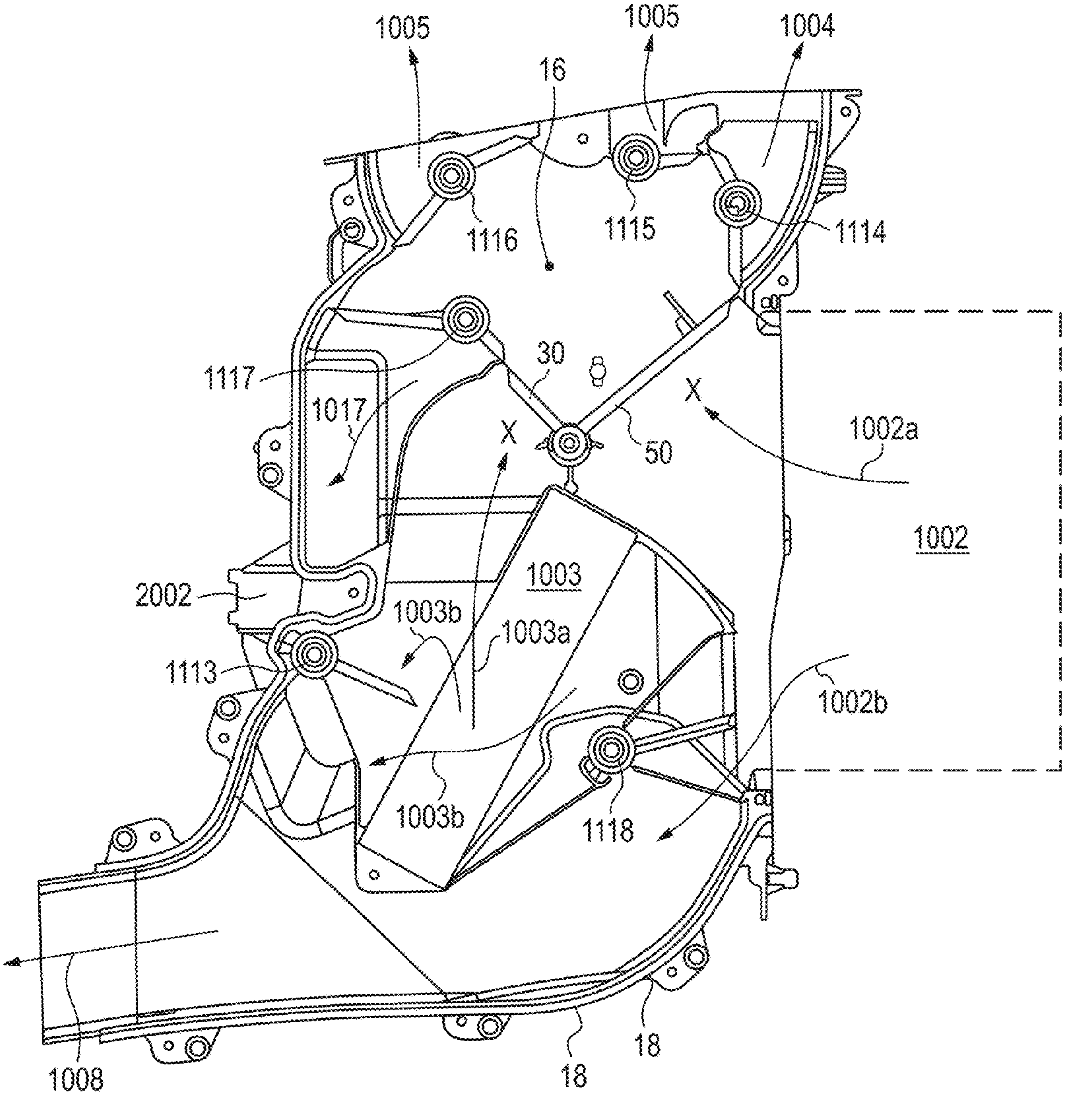
FIG. 8 is a side view of the housing of the air circulation assembly depicting the first and second doors in closed positions preventing flow from the respective hot air and cold air sources to flow into the mixing space, and depicting doors that control flow to the defrost system (1114, 1004), the de-mist system (1115, 1005), the vent panel (1114, 1004), the floor ventilation system (1117, 1007), a cold air flow to an extended air flow system (e.g. controls for air flow for a second or third row of a vehicle (cold air—1118, 1002*b*, 1008, and hot air 1113, 1003*b*, 1008), the valves for the associated systems that receive air from the mixing space (and directly from the cold air and warm air sources to send to the extended air flow system) are depicted in arbitrary closed positions by they can also be in the open position opposite positions to allow air flow therepast).
Figure 10:
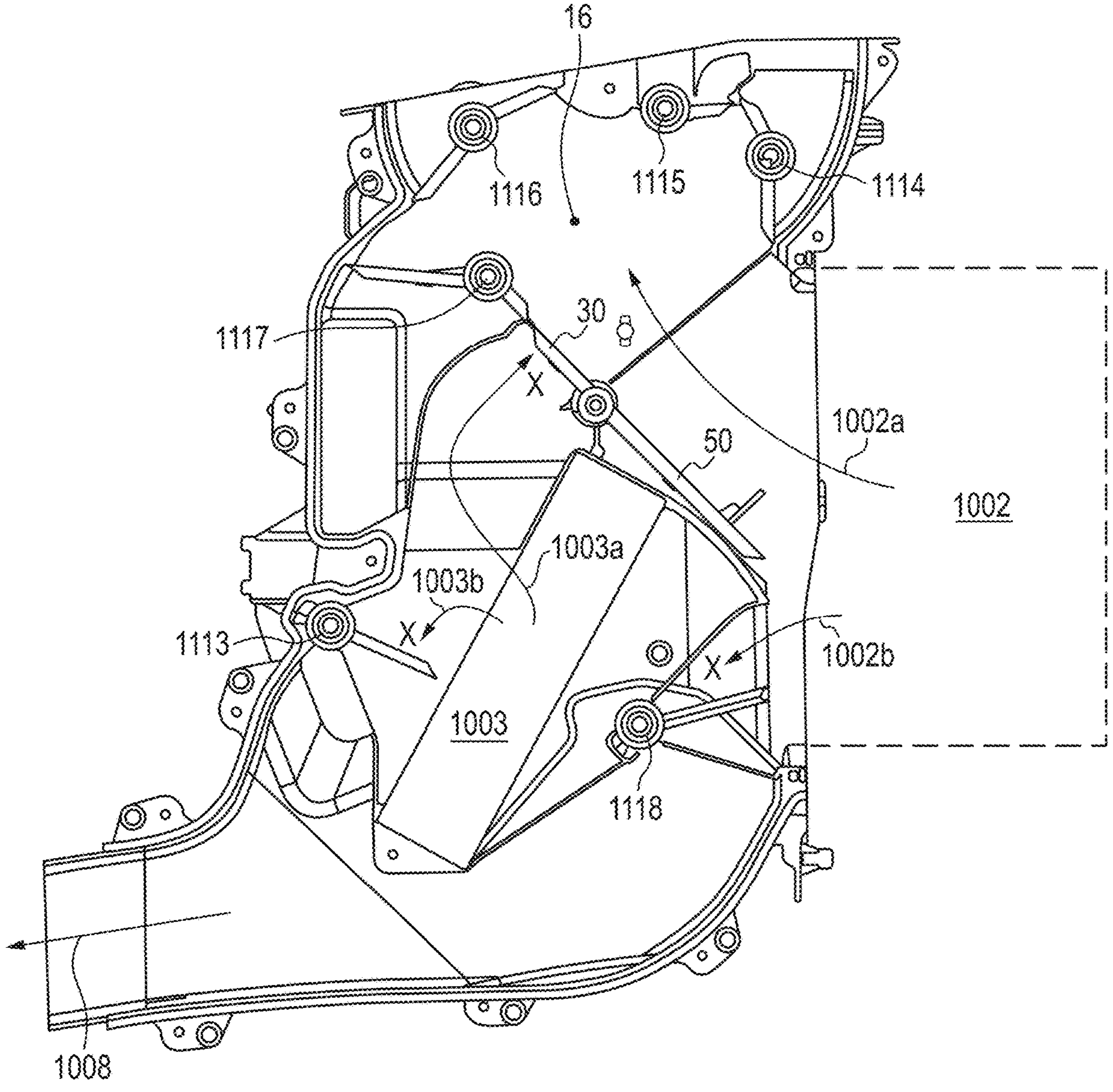
FIG. 10 is the view of FIG. 8 with the first door in the closed position to prevent hot air from flowing into the mixing space and the second door in the open position to allow cold air to flow into the mixing space.
Figure 11:
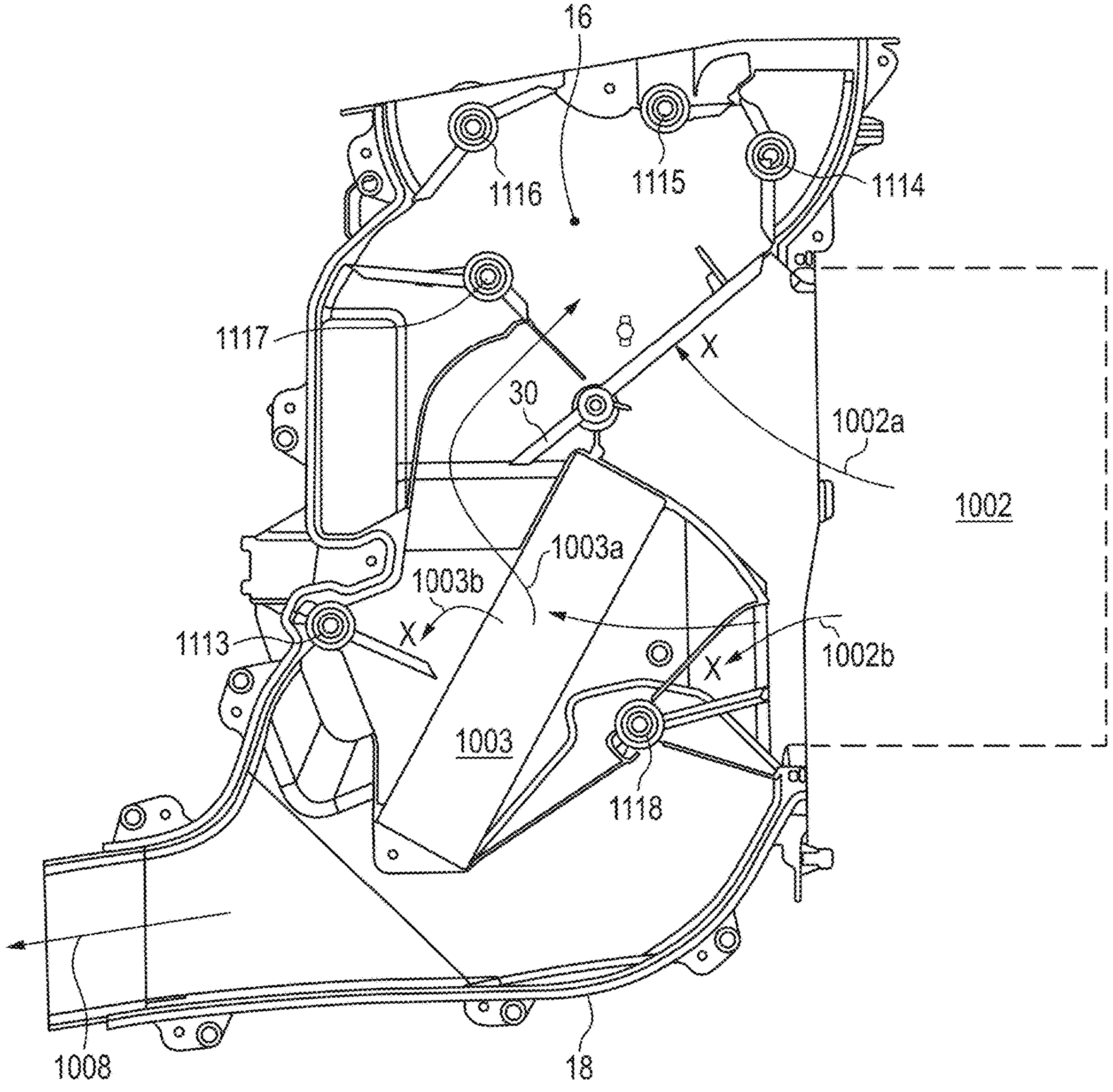
FIG. 11 is the view of FIG. 8 with the first door in the open position to allow hot air to flow into the mixing space and the second door in the closed position to prevent cold air from flowing into the mixing space.
Figure 12:
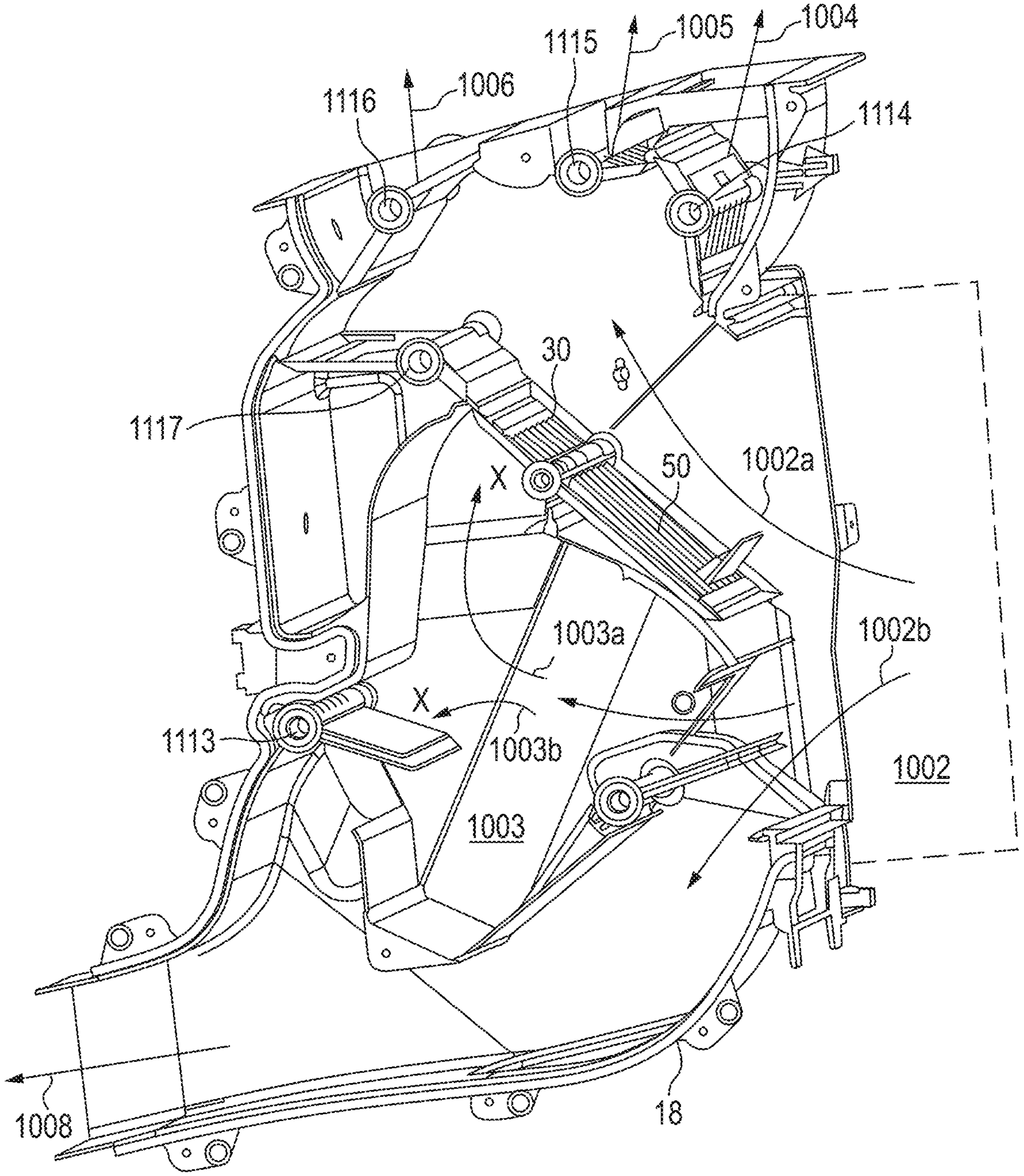
FIG. 12 is a perspective view of the housing in the configuration of FIG. 10.
Figure 13:
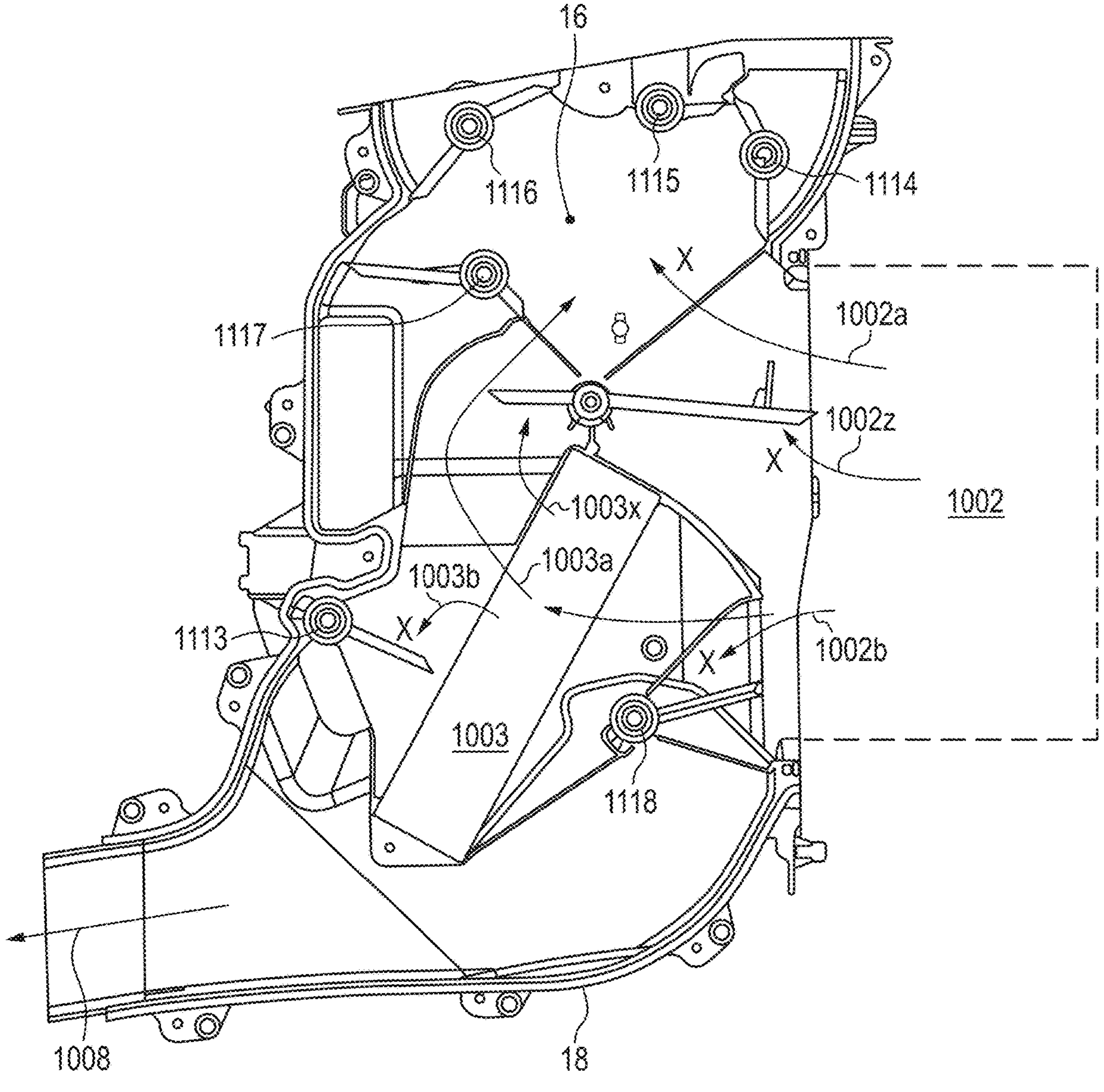
FIG. 13 is the view of FIG. 8 with the first and second doors each in the partially open partially closed (throttled open) position to allow some flow from the respective hot and cold air sources to flow into the mixing space but to not allow full flow as when the respective doors are fully open.
Figure 14B:
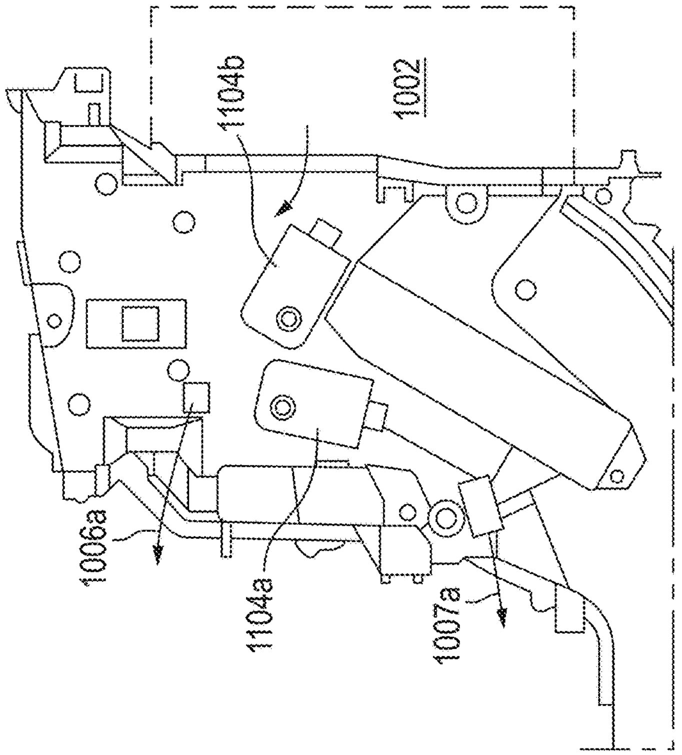
FIG. 14*b* is a view of the outside of the housing that depicts the various actuators that are provided to operate the air mixing damper system that controls air flow to the passenger's side seat area of the interior of a vehicle.
Figure 14A:
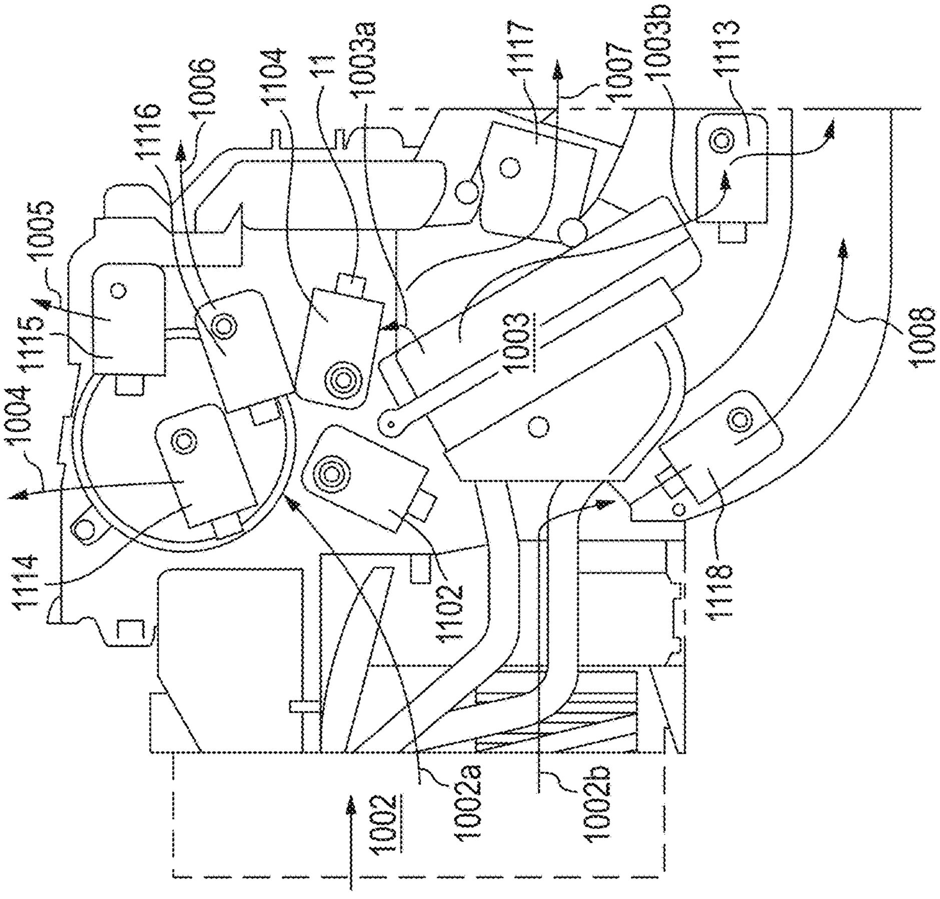
FIG. 14*a* is a view of the outside of the housing that depicts the various actuators that are provided to operate the air mixing damper system that controls air flow to the driver's side seat area of the interior of a vehicle.

As best understood with reference to FIGS. 2, 6, 8, 13*a*, and 13*b*, the first actuator 1104, the first hub 23, and the second hub 26 (and their corresponding gear teeth) may be positioned on an outside surface of the housing 18. In some embodiments, a feature 82 may be provided outboard of the first hub 23 and the gear teeth 24, and the feature is positioned, sized and shaped to mechanically limit the range of travel of the first hub 23. In the depicted embodiment, the feature 82 is a "C" shape and is concentric with the first hub 23, with the two end faces 82*a*, 82*b* positioned to contact opposite ends of the gear teeth 24 when the first hub 23 is at both ranges of potential rotation. FIG. 6 depicts the gear teeth 24 (and specifically surface 24*b*) in contact with end 82*a* of the feature, which results in the first door being positioned as depicted in FIGS. 8 and 10—i.e. to prevent flow of air past the first door (hot air 1003 flow prevented). As can be understood, when the first hub 23 is positioned such that the first door is fully open, the opposite surface 24*a* of the gear teeth 24 contacts the opposite end surface 82*b* of the feature 82.

In some embodiments, a cover (not shown) is provided upon the housing 16 to enclose the first and first and second actuators 1104, 1106, the first and second hubs 23, 26 to prevent mechanical interference with these components.

The first shaft 27 extends through a hole (not shown) in the housing 18 to enter into the enclosed space of the housing and to connect to the first door 30.

The second door 50 is fixed to the second shaft 47, such that rotation of the second shaft 47 causes rotation of the second door 50 (with respect to the housing 18).

The second shaft 47 may be hollow and extends along a second axis 1301 that is co-linear with the first axis 1300. A third shaft 42 extends through the second shaft 47 and the first shaft 27, and the third shaft 42 is fixed to the second shaft 47. The third shaft 42 and the second shaft 47 can freely rotate with respect to the first shaft 27.

In some embodiments, the first and second shafts 27, 47 are arranged similar to a conventional door hinge such that the first shaft 27 has two or more round and hollow components that are spaced from each other, and the second shaft 47 has two or more round and hollow components that are spaced from each other, with the first and second shafts 27, 47 arranged such that the second shaft components 47 are positioned within spaces between the first shaft components 27, at the inner spaces of the first shaft. In some embodiments, the first shaft 27 has three components and two spaces 27*a*, and the second shaft 47 has two components that extend within the two spaces. In other embodiments. In other embodiments, the first and second shafts may have the same number of components and spaces (with each shaft having a "space" after the shaft ends) such that the order is first, second, first, second (etc. as desired).

The first door 30 bridges across and outside of the components of the second shaft 47, and the second door 50 bridges across and outside of the components of the first shaft 27.

The one end of the first shaft 27*z* forms a bearing to support an end 42*z* of the third shaft 42. In embodiments where the first and second shafts 27, 47 are arranged line opposing cylindrical portions of a conventional door hinge, the third shaft 42 extends coaxially within the apertures of the first and second shafts like the pin of a the conventional door hinge.

The third shaft 42 is rotatably fixed to the second shaft 47 such that torque applied to the third shaft 42, as discussed below, is transferred to the second shaft 47. As best understood with reference to FIGS. 7-7*b*, the third shaft 42 extends through the first shaft 27 (and the tip 42*z* is supported by a bearing 27*z* in the first shaft 27). In some embodiments, a portion of the third shaft 42 that extend through the first and second shafts 27, 47 may have a flat portion to establish a "D" shaped shaft with the aperture 47*y* in the second shaft 47 establishing a corresponding D shape. Alternatively, in some embodiments, the third shaft may have a portion 42*x* that includes one more radially extending lobes 42*w* with the aperture 47*x* in the second shaft having a plurality of voids 47*w* to closely accept the respective one or more radially extending lobes of the third shaft 42. The apertures through the first shaft 27 (and specifically the first shaft 27 portions away from the bearing portion 27*z*) have a larger aperture to allow the third shaft 42 to freely rotate within the first shaft 27 without contacting the first shaft 27. In the depicted embodiment, the second portion 47*b* of the second shaft 47 (i.e. the second shaft portion further from the second hub 26) may have a smaller diameter hole 47*z* and include the voids 47*w* to mate with the corresponding portion of the third shaft 42. The first portion 47*a* (i.e. the second shaft portion closer to the second hub 26) may have an aperture 47*y* that is large enough to allow the portion 42*x* of the third shaft 42 to pass through, but sized to interact with the D-shaped portion 42*y*. Other arrangements to rotatably fix the third shaft 42 to the second shaft 47 but allow rotation of the third shaft 42 with respect to the first shaft 27 may be provided.

The third shaft is configured to be fixed to the second actuator 1106. In the depicted embodiment, the third shaft 42 is aligned along the second axis 1302. Rotation of the second actuator 1106 causes rotation of the third shaft 42, which causes rotation of the second shaft 47 and the second door 50.

Figure 9:
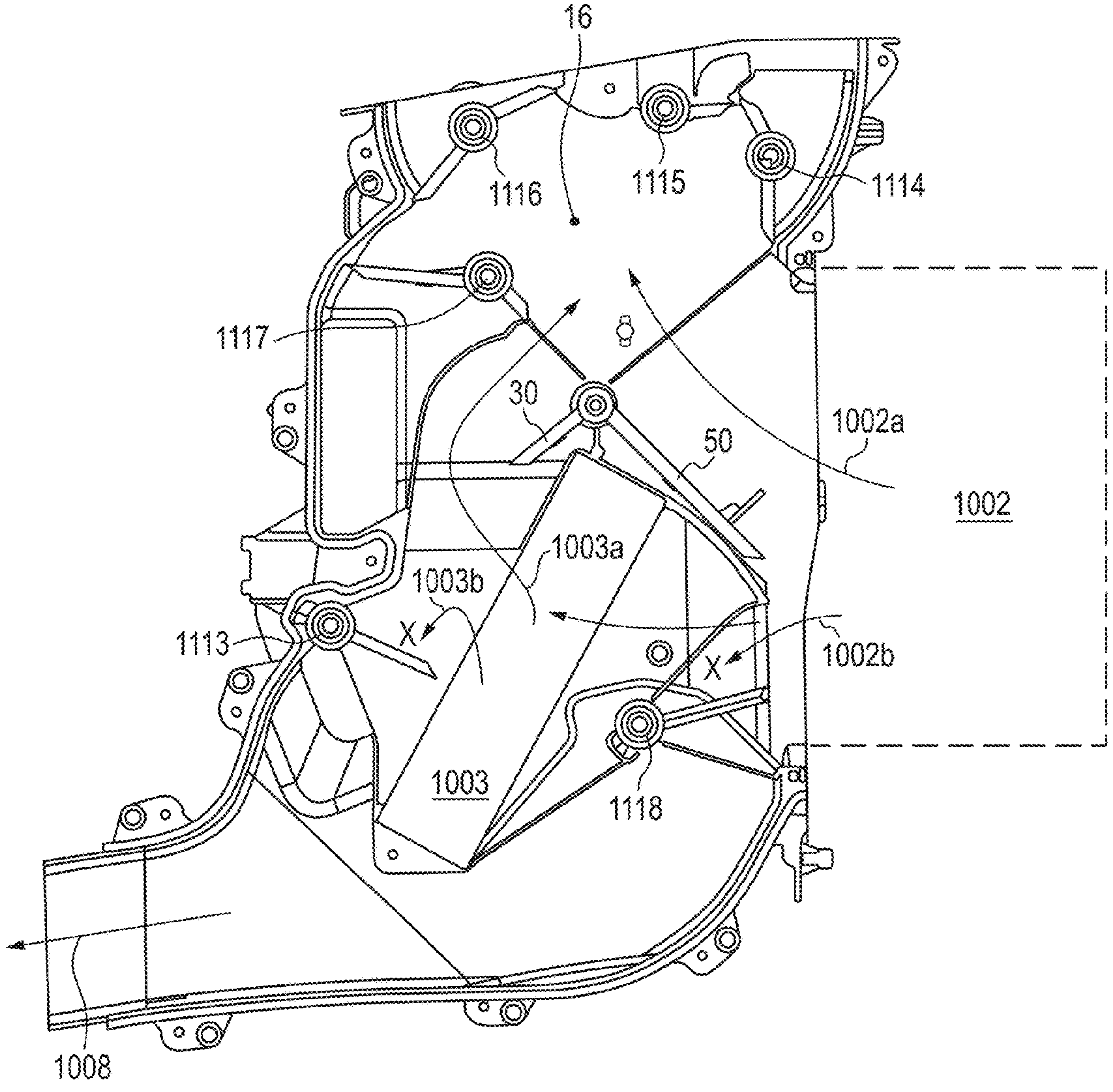
FIG. 9 is the view of FIG. 8 with the first and second doors in the open positions to allow flow form the respective hot and cold air sources into the mixing space.

As with the first actuator 1104, the second actuator 1106 is positioned on the outside surface of the housing 18. The housing 18 may include one or two second features 84 that are positioned to limit the travel of the third shaft 42. For example, the third shaft 42 may be support and be fixed to a third hub 43, with a radial leg 44 extending from the third hub 43. The second features 84 are positioned to be contacted by the radial leg 44 when the third shaft 42—and therefore the second door 50—have reached the extent of the desired range of rotation of the second door 50 to establish the open and closed positions (the second door 50 allows, prevents, or throttles flow of cold air 1002a from the cold air system 1002). In the position depicted in FIG. 6, the radial leg is contacting one of the second features 84 and the second door 50 is in the fully open position (FIGS. 9, 10). It will be easily understood by one of ordinary skill in the art with a thorough review of this specification and figures that a second feature can be provided and positioned to be engaged by the radial leg 44 when the second door 50 is in the fully closed position (with respect to the housing 18). In the embodiment depicted in FIG. 6 the second feature 84 is a post that is contacted by the radial leg, but in other embodiments the second feature 84 may be a c-shaped feature similar to the first feature 82. In the embodiment depicted in FIG. 6 the second feature 84 extends further from the planar surface of the housing 18 that supports the assembly than the second feature 82 because of the relatively positions of the first, second, and third hubs 23, 26, 43 with respect to the housing 18. As discussed above, the cover (not shown) may cover the second actuator 1106, second hub 43 and the radial leg 44.

The first door 30 and the second door 50 can be rotated independently of each other by the respective first and second actuators 1104, 1106. The first and second doors 30, 50 can each be moved between their open and closed positions (with respect to the features of the housing 18) and various throttled positions between the fully open and closed positions. The first and second doors 30, 50 can be maintained in their current positions, either for a set period of time, or in some embodiments until the receipt of a new control input or until a set time for the position has expired—or until the controller 2002 identifies that the position must be adjusted due to the feedback control.

The rotation of the first and second doors 30, 50 is controlled by the controller 2002, via signals that are sent to the respective first and second actuators. The positions of the first and second doors 30, 50 are controlled either by pre-programed positioned table based upon the desired air flow and air temperature parameters set by the user. In some embodiments, the position of the first and second doors 30, 50 (including being throttled, and a specific throttled position of each door) may be positioned by the controller based upon feedback control—based upon sensed temperatures either within the system 2000 or within the controlled space within the vehicle that receives the specific air flow. In addition the controller 2002 controlling first and second valve position 30, 50, the controller may also control the fan speed for the hot and cold air flows (1003a, 1002a) as well as the duty cycle of the heating system 1003 or cooling system 1002.

Figure 7:
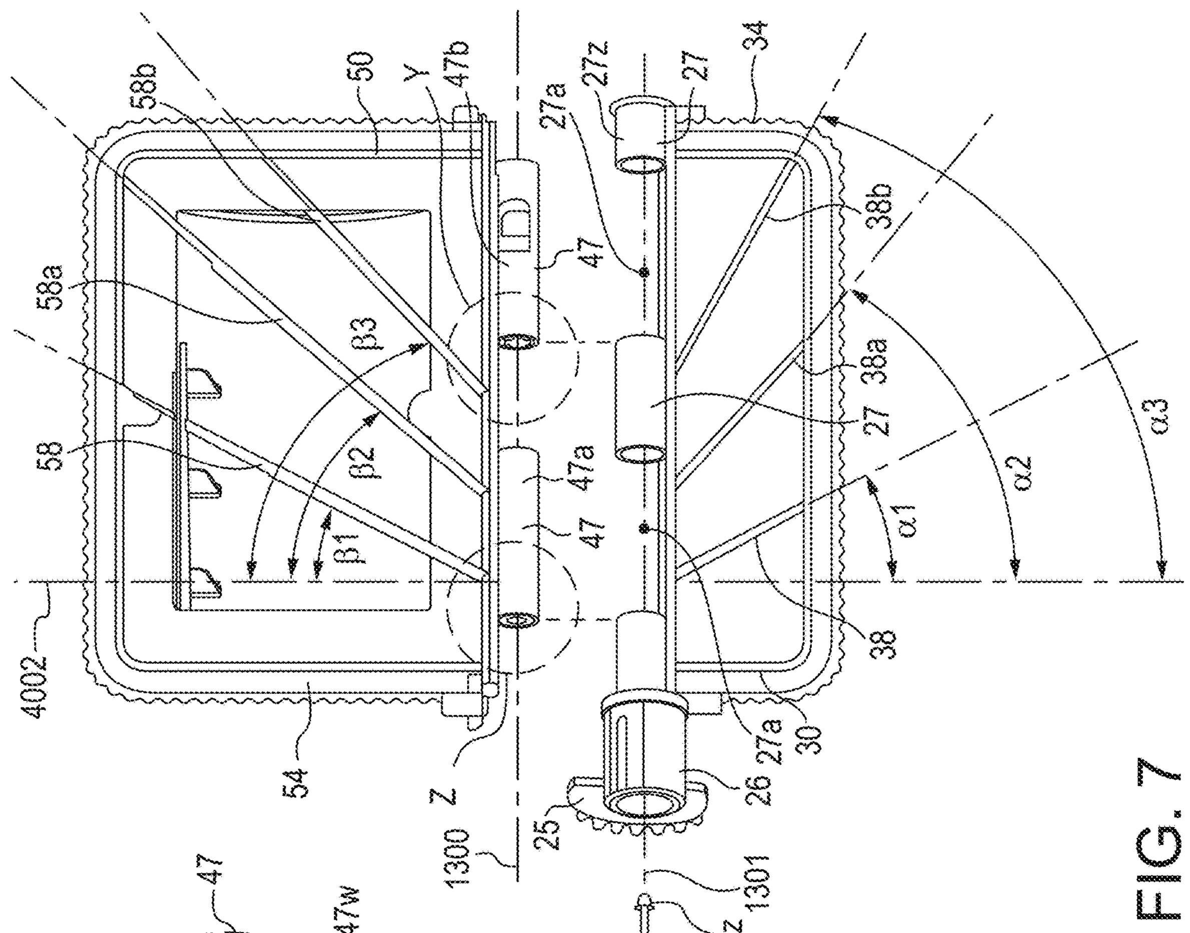
FIG. 7 is an exploded view of the second shaft and the first and second doors.
Figure 7B:
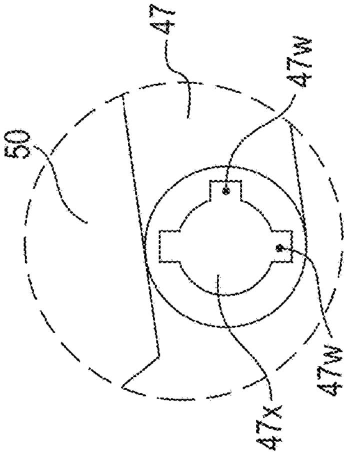
FIG. 7*b* is a detail view of detail Y of FIG. 7.
Figure 7A:
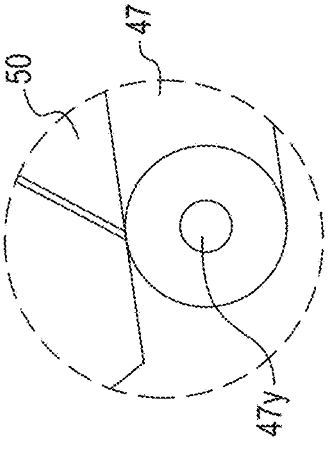
FIG. 7*a* is a detail view of detail Z of FIG. 7.

In some embodiments and as best depicted in FIG. 7, one or both of the first and second doors 27, 47 may have one or more elongate ribs (38, 38a, 38b; 58, 58a, 58b) that extend outwardly from the planar surface of the respective door 30, 50. The ribs may be provided to provide additional strength to the door to prevent bending, particularly when the door is closed with a tight seal against the housing, as discussed below—to provide strength to the door against the pressure that the air flow (1002a—second door 50; 1003a—first door 30) imparts against the door's surface. In some embodiments, the ribs may be either parallel to a line 4002 that perpendicular to the first axis 1300 (1301), or lines parallel to the first axis. In other embodiments, the ribs may be at an acute angle to the line 4002 (α—first door 30), (β—second door 50). In some embodiments, multiple lines may be provided at different acute angles—e.g. α1, α2, α3—first door 30, and β1, β2, β3, second door 50). Other arrangements, orientations, and shapes of the ribs may be provided to add strength of to the doors against bending, as well as in some embodiments to interact with the air that flows past the door to act as vanes to direct the air into the mixing chamber 16 or in certain directions. Alternatively or additionally, the ribs may be sized and shaped to cause local turbulent flow of a portion of the air to aid in mixing or for other purposes.

The doors 30, 50 may support structures that extend outward from the door such as element 55 (FIG. 1). These may alter the air flow. Alternatively, the features may interact with portions of the housing to change the air flow path (aperture size for air flow thereacross when fully open or in certain throttle positions. One of ordinary skill in the art would be able to design a door with desired ribs 38/58 or elements 55 that effect the air flow past the respective door, or alter the air flow opening during door movement or in throttled positions, and developing these features upon the door upon a thorough review and understanding of this specification can be provided and optimized with only routine experimentation.

In some embodiments, one or both of the first and second doors 30, 50 may have an edge surface or edge portion that as a coating or a material placed thereon that is provided to allow for tight air seal with the corresponding portions of the housing 18 when the respective door 30, 50 is in the closed position. In some embodiments, the coating or material may be an elastomeric material that is somewhat or substantially flexible to locally deform when contacting a surface of the housing 18 to establish a tight engagement, to eliminate or minimize the ability of air to flow therepast. The elastomeric coating may also benefit from dampening any noise when the surface of the door impacts upon the housing 18 to minimize the noise or vibrations that travels to the passenger compartment of the vehicle during operation.

As shown in FIGS. 8-12, a second flow path 1008 is may be provided from the assembly 10 and to a remote space within the vehicle that may be independently controlled from a space proximate to the driver and passenger seat area. The flowpath 1008 receives air flow from the cold system (flow 1002b) and flow from the hot system (1003b), and may be independently controlled with dedicated cold air and hot air valves 1118, 1113. Flow through the second flow path 1008 does not flow past the air mixing damper system 10, but instead travels directly to the valves 1118, and 1113 from the respective cold and hot air systems, such that air flowing to the second flow path 1008 does not flow past, and is not blocked by the first and second doors 30, 50.

The term "about" is specifically defined herein to include a range that includes the reference value and plus or minus 5% of the reference value. The term "substantially the same" is satisfied when the width of the end surfaces of the holes are both within the above range.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification can be readily understood with reference to the following Representative Paragraphs:

Representative Paragraph 1: An air mixing damper system, comprising:

- a first rotatable door that rotates about a first shaft that extends along a first axis;

a second rotatable door that rotates about a second shaft, the second shaft disposed along a second axis, the second axis is collinear with the first axis;

the first door is rotatable about the first axis and the second door is rotatable about the second axis;

a first actuator operatively engaged with the first shaft;

a second actuator operatively engaged with the second shaft, wherein the first and second doors are each capable of rotating independently of the other of the first and second doors.

Representative Paragraph 2. The air mixing damper system of Representative Paragraph 1, wherein the first actuator and the second actuator each operate such that the respective first and second doors can independently be moved between an open configuration and a closed configuration and can each be independently maintained in the closed and open positions.

Representative Paragraph 3: The air mixing damper system of Representative Paragraph 2, wherein the first actuator operates such that the first door can be positioned in a plurality of intermediate positions between the open configuration and closed configuration.

Representative Paragraph 4: The air mixing damper system of either one of Representative Paragraphs 2 or 3, wherein the second actuator operates such that the second door can be positioned in a plurality of intermediate positions between the open configuration and the closed configuration.

Representative Paragraph 5: The air mixing damper system of any one of Representative Paragraphs 1-4, wherein the first actuator provides torque along a third axis that is parallel the first axis but is offset from the first axis, and the second actuator provides torque along the second axis.

Representative Paragraph 6: The air mixing damper system of Representative Paragraph 5, wherein further comprising an input gear that is constrained with the first actuator and an output gear, wherein the input gear rotates about the third axis and the output gear is meshed with the input gear and rotates about the first axis.

Representative Paragraph 7: The air mixing damper system of any one of the preceding Representative Paragraphs, further comprising an inner shaft that extends coaxially within the first and second shafts, wherein the inner shaft receives torque from the second actuator and transfers torque to the second shaft.

Representative Paragraph 8: The air mixing damper system of any one of Representative Paragraphs 1-6, wherein the first and second shafts are arranged adjacent to each other, wherein first door extends radially from the first shaft and the second door extends radially from the second shaft.

Representative Paragraph 9: The air mixing damper of Representative Paragraph 8, wherein the first door bridges outside of and across the second shaft, and wherein the second door bridges outside of and across first shaft.

Representative Paragraph 10: The air mixing damper system of Representative Paragraph 9, wherein the first and second shafts are arranged like opposing cylindrical portions of a conventional door hinge, further comprising an inner shaft that extends coaxially within the first and second shaft, wherein the inner shaft is arranged like a pin of the conventional door hinge.

Representative Paragraph 11: The air mixing damper system of Representative Paragraph 10, wherein the inner shaft receives torque from the second actuator and transfers torque to the second shaft.

Representative Paragraph 12: The air mixing damper system of Representative Paragraph 11, wherein the inner shaft includes a plurality of radially extending lobes along a portion of a length of the inner shaft, wherein the second shaft includes a plurality of cutouts that each received a lobe of the plurality of radially extending lobes therein to transfer torque from the inner shaft to the second shaft.

Representative Paragraph 13: The air mixing damper system of any one of Representative Paragraphs 8-12, wherein the first door is fixed to the first shaft and the second door is fixed to the second shaft.

Representative Paragraph 14: The air mixing damper system of any one of Representative Paragraphs 1-13, wherein one or both of the first and second doors have one or more longitudinal ribs that extend from a planar face of the respective door. Representative Paragraph 15: The air mixing damper system of Representative Paragraph 14, wherein the one or more longitudinal ribs are a plurality of ribs that extend an acute angle from a line that extends perpendicular to the first axis.

Representative Paragraph 16: The air mixing damper system of Representative Paragraph 15, each of the plurality of ribs within one of the first or second doors extend at different acute angles from each of the other ribs upon the same of the first or second door.

Representative Paragraph 17: The air mixing damper system of any one of Representative Paragraphs 1-16, wherein outer perimeter edge of both of the first and second doors includes an elastomeric material in positions where contact is made between the respective perimeter edge of the door and fixed surfaces within a housing the rotatably receives the door.

Representative Paragraph 18: An air circulation assembly, comprising the air mixing damper system of any one of Representative Paragraphs 1-17, wherein the first and second actuators and the first and second shafts are supported by a housing, wherein the housing is configured to be connected to a source of relatively cold air and a source of relatively hot air, wherein the housing establishes a mixing space therein, and the housing is further configured to be connected to selectively and independently allow air flow from the mixing space to a plurality of air outlets within a vehicle, and further comprising a controller, wherein the controller causes operation of the first actuator to cause the first door to be positioned with respect to the source of relatively hot air to selectively allow or prevent a flow of relatively hot air from the source of relatively hot air into the mixing space, and the controller causes operation of the second actuator to cause the second door to be positioned with respect to the source of relatively cold air to selectively allow or prevent a flow of relatively cold air from the source of relatively cold air to the mixing space.

Representative Paragraph 19: The air circulation assembly of Representative Paragraph 18, wherein the controller is configured to operate the first actuator to cause the first door to be positioned with respect to the source of relatively hot air to a throttled position to allow an amount of relatively hot air into the mixing space that is less than an amount of relatively hot air that could flow to the mixing space if the first door was in a fully opened configuration, and the controller is configured to operate the second actuator to cause the second door to be positioned with respect to the source of relatively cold air to a throttled position to allow an amount of relatively cold air into the mixing space that is less than amount of relatively cold air that could flow to the mixing space if the second door was in a fully opened configuration.

Representative Paragraph 20: The air circulation assembly of Representative Paragraph 19, wherein the housing comprises a plurality of auxiliary valves that are independently operated by the controller, wherein each auxiliary valve when in an open position allows air flow from the mixing space to a specific air outlet within the vehicle that is associated with the auxiliary valve, wherein each auxiliary valve is operated by the controller between an open position and a closed position.

Representative Paragraph 21: The air circulation assembly of Representative Paragraph 20, wherein each of the plurality of auxiliary valves are positioned in either the open position or in a closed position that prevents air flow from the mixing space to the specific air outlet within the vehicle that is associated with the auxiliary valve.

Representative Paragraph 22: The air circulation assembly of Representative Paragraph 20, wherein the specific air outlets within the vehicle includes a front windshield defrost system, a side window defrost system, a vent panel air flow system, and a front row floor ventilation system.

Representative Paragraph 23: The air circulation assembly of any one of Representative Paragraphs 18-22, wherein the housing includes a flow path that selectively allows or prevents air flow from the source of relatively hot air and from the source of relatively cold air to flow to a remote environment within a vehicle, wherein the air that flows into the flow path to the remote environment does not interact with the first and second doors.

Representative Paragraph 24: The air circulation assembly of any one of Representative Paragraphs 18-23, wherein the housing comprises first and second air mixing damper systems that each are positioned upstream of respective first and second mixing spaces, wherein the controller independently controls the first and second actuators associated with each of the first and second air mixing damper systems, wherein a portion of the air flowing from the air mixing space associated with the first air mixing damper system is configured to be directed to a vent panel air flow system and/or a front row floor ventilation system proximate to a driver's seat area of a vehicle, and a portion of the air flowing from the air mixing space associated with the second air mixing damper system is configured to be directed to a vent panel air flow system and/or a front row floor ventilation system proximate to a front passenger's seat area of a vehicle.

Representative Paragraph 25: The air circulation assembly of any one of Representative Paragraphs 18-23, wherein the housing further comprises a first mechanical stop that is disposed proximate to the first actuator, wherein the first mechanical stop is positioned to directly limit a range of rotation of a first component that directly receives torque from the first actuator; and the housing further comprises a second mechanical stop that is disposed proximate to the second actuator, wherein the second mechanical stop is positioned to interact with a leg that extends radially from a fourth shaft that directly receives torque from the second actuator and is rotatably fixed to the second shaft.

The invention claimed is:

1. An air mixing damper system, comprising:

a first rotatable door that rotates about a first shaft that extends along a first axis;

a second rotatable door that rotates about a second shaft, the second shaft disposed along a second axis, the second axis is collinear with the first axis;

the first door is rotatable about the first axis and the second door is rotatable about the second axis;

a first actuator operatively engaged with the first shaft;

a second actuator operatively engaged with the second shaft, wherein the first and second doors are each capable of rotating independently of the other of the first and second doors, wherein the first shaft comprises two or more round and hollow components that include first spaces between adjacent components of the first shaft, and the second shaft comprises two or more round and hollow components that include second spaces between adjacent components of the second shaft, wherein at least one of the round and hollow components of the first shaft is disposed within a second space, and at least one round and hollow components of the second shaft is disposed within a first space, further comprising an inner shaft that extends coaxially within at least one round and hollow components of each of the first and second shafts, wherein the inner shaft is arranged like a pin of a conventional door hinge.

2. The air mixing damper system of claim 1, wherein the first actuator and the second actuator each operate such that the respective first and second doors can independently be moved between an open configuration and a closed configuration and can each be independently maintained in the closed and open positions.

3. The air mixing damper system of claim 2, wherein the first actuator operates such that the first door can be positioned in a plurality of intermediate positions between the open configuration and closed configuration.

4. The air mixing damper system of claim 2, wherein the second actuator operates such that the second door can be positioned in a plurality of intermediate positions between the open configuration and the closed configuration.

5. The air mixing damper system of claim 1, wherein the first actuator provides torque along a third axis that is parallel the first axis but is offset from the first axis, and the second actuator provides torque along the second axis.

6. The air mixing damper system of claim 5, wherein further comprising an input gear that is constrained with the first actuator and an output gear, wherein the input gear rotates about the third axis and the output gear is meshed with the input gear and rotates about the first axis.

7. The air mixing damper system of claim 1, wherein the first and second shafts are arranged adjacent to each other, wherein first door extends radially from the first shaft and the second door extends radially from the second shaft.

8. The air mixing damper of claim 7, wherein the first door extends outside of and across the second shaft, and wherein the second door extends outside of and across first shaft.

9. The air mixing damper system of claim 1, wherein the inner shaft receives torque from the second actuator and transfers torque to the second shaft.

10. The air mixing damper system of claim 9, wherein the inner shaft includes a plurality of radially extending lobes along a portion of a length of the inner shaft, wherein the second shaft includes a plurality of cutouts that each received a lobe of the plurality of radially extending lobes therein to transfer torque from the inner shaft to the second shaft.

11. The air mixing damper system of claim 7, wherein the first door is fixed to the first shaft and the second door is fixed to the second shaft.

12. The air mixing damper system of claim 1, wherein one or both of the first and second doors have one or more longitudinal ribs that extend from a planar face of the respective door.

13. The air mixing damper system of claim 12, wherein the one or more longitudinal ribs are a plurality of ribs that extend an acute angle from a line that extends perpendicular to the first axis.

14. The air mixing damper system of claim 13, each of the plurality of ribs within one of the first or second doors extend at different acute angles from each of the other ribs upon the same of the first or second door.

15. The air mixing damper system of claim 1, wherein outer perimeter edge of both of the first and second doors includes an elastomeric material in positions where contact is made between the respective perimeter edge of the door and fixed surfaces within a housing the rotatably receives the door.

16. An air circulation assembly, comprising the air mixing damper system of claim 1, wherein the first and second actuators and the first and second shafts are supported by a housing, wherein the housing is configured to be connected to a source of relatively cold air and a source of relatively hot air, wherein the housing establishes a mixing space therein, and the housing is further configured to be connected to selectively and independently allow air flow from the mixing space to a plurality of air outlets within a vehicle, and further comprising a controller, wherein the controller causes operation of the first actuator to cause the first door to be positioned with respect to the source of relatively hot air to selectively allow or prevent a flow of relatively hot air from the source of relatively hot air into the mixing space, and the controller causes operation of the second actuator to cause the second door to be positioned with respect to the source of relatively cold air to selectively allow or prevent a flow of relatively cold air from the source of relatively cold air to the mixing space.

17. The air circulation assembly of claim 16, wherein the controller is configured to operate the first actuator to cause the first door to be positioned with respect to the source of relatively hot air to a throttled position to allow an amount of relatively hot air into the mixing space that is less than an amount of relatively hot air that could flow to the mixing space if the first door was in a fully opened configuration, and the controller is configured to operate the second actuator to cause the second door to be positioned with respect to the source of relatively cold air to a throttled position to allow an amount of relatively cold air into the mixing space that is less than amount of relatively cold air that could flow to the mixing space if the second door was in a fully opened configuration.

18. The air circulation assembly of claim 17, wherein the housing comprises a plurality of auxiliary valves that are independently operated by the controller, wherein each auxiliary valve when in an open position allows air flow from the mixing space to a specific air outlet within the vehicle that is associated with the auxiliary valve, wherein each auxiliary valve is operated by the controller between an open position and a closed position.

19. The air circulation assembly of claim 18, wherein each of the plurality of auxiliary valves are positioned in either the open position or in a closed position that prevents air flow from the mixing space to the specific air outlet within the vehicle that is associated with the auxiliary valve.

20. The air circulation assembly of claim 18, wherein the specific air outlets within the vehicle includes a front windshield defrost system, a side window defrost system, a vent panel air flow system, and a front row floor ventilation system.

21. The air circulation assembly of claim 16, wherein the housing includes a flow path that selectively allows or prevents air flow from the source of relatively hot air and from the source of relatively cold air to flow to a remote environment within a vehicle, wherein the air that flows into the flow path to the remote environment does not interact with the first and second doors.

22. The air circulation assembly of claim 16, wherein the housing comprises first and second air mixing damper systems that each are positioned upstream of respective first and second mixing spaces, wherein the controller independently controls the first and second actuators associated with each of the first and second air mixing damper systems, wherein a portion of the air flowing from the air mixing space associated with the first air mixing damper system is configured to be directed to a vent panel air flow system and/or a front row floor ventilation system proximate to a driver's seat area of a vehicle, and a portion of the air flowing from the air mixing space associated with the second air mixing damper system is configured to be directed to a vent panel air flow system and/or a front row floor ventilation system proximate to a front passenger's seat area of a vehicle.

23. The air circulation assembly of claim 16, wherein the housing further comprises a first mechanical stop that is disposed proximate to the first actuator, wherein the first mechanical stop is positioned to directly limit a range of rotation of a first component that directly receives torque from the first actuator; and the housing further comprises a second mechanical stop that is disposed proximate to the second actuator, wherein the second mechanical stop is positioned to interact with a leg that extends radially from a fourth shaft that directly receives torque from the second actuator and is rotatably fixed to the second shaft.

24. An air mixing damper system, comprising:

a first rotatable door that rotates about a first shaft that extends along a first axis;

a second rotatable door that rotates about a second shaft, the second shaft disposed along a second axis, the second axis is collinear with the first axis;

the first door is rotatable about the first axis and the second door is rotatable about the second axis;

a first actuator operatively engaged with the first shaft;

a second actuator operatively engaged with the second shaft, wherein the first and second doors are each capable of rotating independently of the other of the first and second doors, wherein the first and second actuators and the first and second shafts are supported by a housing, wherein the housing is configured to be connected to a source of relatively cold air and a source of relatively hot air, wherein the housing establishes a mixing space therein, and the housing is further configured to be connected to selectively and independently allow air flow from the mixing space to a plurality of air outlets within a vehicle, and further comprising a controller, wherein the controller causes operation of the first actuator to cause the first door to be positioned with respect to the source of relatively hot air to selectively allow or prevent a flow of relatively hot air from the source of relatively hot air into the mixing space, and the controller causes operation of the second actuator to cause the second door to be positioned with respect to the source of relatively cold air to selectively allow or prevent a flow of relatively cold air from the source of relatively cold air to the mixing space, wherein the housing comprises first and second air mixing damper systems that each are positioned upstream of respective first and second mixing spaces, wherein the controller independently controls the first and second actuators associated with each of the first and second air mixing damper systems, wherein a portion of the air flowing from the air mixing space associated with the first air mixing damper system is configured to be directed to a vent panel air flow system and/or a front row floor ventilation system proximate to a driver's seat area of a vehicle, and a portion of the air flowing from the air mixing space associated with the second air mixing damper system is configured to be directed to a vent panel air flow system and/or a front row floor ventilation system proximate to a front passenger's seat area of a vehicle.

25. The air mixing damper system of claim 24, wherein the first actuator and the second actuator each operate such that the respective first and second doors can independently be moved between an open configuration and a closed configuration and can each be independently maintained in the closed and open positions.

26. The air mixing damper system of claim 24, wherein the first actuator provides torque along a third axis that is parallel the first axis but is offset from the first axis, and the second actuator provides torque along the second axis.

27. The air mixing damper system of claim 24, wherein the first and second shafts are arranged adjacent to each other, wherein first door extends radially from the first shaft and the second door extends radially from the second shaft, wherein the first door extends outside of and across the second shaft, and wherein the second door extends outside of and across first shaft.

28. The air mixing damper system of claim 24, wherein the first and second actuators and the first and second shafts are supported by a housing, wherein the housing is configured to be connected to a source of relatively cold air and a source of relatively hot air, wherein the housing establishes a mixing space therein, and the housing is further configured to be connected to selectively and independently allow air flow from the mixing space to a plurality of air outlets within a vehicle, and further comprising a controller, wherein the controller causes operation of the first actuator to cause the first door to be positioned with respect to the source of relatively hot air to selectively allow or prevent a flow of relatively hot air from the source of relatively hot air into the mixing space, and the controller causes operation of the second actuator to cause the second door to be positioned with respect to the source of relatively cold air to selectively allow or prevent a flow of relatively cold air from the source of relatively cold air to the mixing space.

29. The air mixing damper system of claim 28, wherein the housing further comprises a first mechanical stop that is disposed proximate to the first actuator, wherein the first mechanical stop is positioned to directly limit a range of rotation of a first component that directly receives torque from the first actuator; and the housing further comprises a second mechanical stop that is disposed proximate to the second actuator, wherein the second mechanical stop is positioned to interact with a leg that extends radially from a fourth shaft that directly receives torque from the second actuator and is rotatably fixed to the second shaft.

* * * * *